United States Patent
Ozakdag et al.

(10) Patent No.: US 11,625,376 B2
(45) Date of Patent: Apr. 11, 2023

(54) SENSOR DATA ANALYSIS SYSTEM AND METHOD

(71) Applicant: Palantir Technologies Inc., Palo Alto, CA (US)

(72) Inventors: Gokcan Ozakdag, London (GB); Maciej Foks, London (GB)

(73) Assignee: Palantir Technologies Inc., Denver, CO (US)

(*) Notice: Subject to any disclaimer, the term of this patent is extended or adjusted under 35 U.S.C. 154(b) by 376 days.

(21) Appl. No.: 16/818,385

(22) Filed: Mar. 13, 2020

(65) Prior Publication Data
US 2020/0293505 A1   Sep. 17, 2020

(30) Foreign Application Priority Data
Mar. 13, 2019 (GB) .................................. 1903447

(51) Int. Cl.
*G06F 16/22* (2019.01)

(52) U.S. Cl.
CPC ................................ *G06F 16/2228* (2019.01)

(58) Field of Classification Search
CPC ..... G06F 16/2228; G06F 16/282; G06F 16/26
See application file for complete search history.

(56) References Cited

U.S. PATENT DOCUMENTS

2012/0197856 A1* 8/2012 Banka ................. H04L 67/2885
                                                                707/706
2018/0348961 A1* 12/2018 Wilczynski ........... G06F 16/322

FOREIGN PATENT DOCUMENTS

EP    3410315    12/2018
EP    3722969    10/2020

OTHER PUBLICATIONS

Official Communication for European Patent Application No. 20163123.1 dated Sep. 10, 2020, 7 pages.
Yong Yao et al., "The Cougar Approach to In-Network Query Processing in Sensor Networks", Sigmod Record, ACM, vol. 31, No. 3, Sep. 1, 2002, 10 pages.

(Continued)

*Primary Examiner* — Alford W Kindred
*Assistant Examiner* — Cecile H Vo
(74) *Attorney, Agent, or Firm* — Knobbe, Martens, Olson & Bear, LLP

(57) ABSTRACT

A data aggregation system is described, wherein the data aggregation system may include: a plurality of sensors distributed throughout an environment; a tile database comprising a memory for storing a hierarchy of tiled layers, wherein each layer in the hierarchy of tiled layers comprises a plurality of tiles; a tiling server, the tiling server configured to: receive sensor data from one or more sensors in the plurality of sensors; assign the sensor data to a base tile in a first layer in the hierarchy of tiled layers based on one or more properties of the one or more sensors; retrieve one or more aggregate tiles from the tile database based on an identity of the base tile in the first layer, the one or more aggregate tiles each taken from one or more further layers in the hierarchy of tiled layers; determine aggregate sensor data for each of the retrieved one or more aggregate tiles based on the sensor data stored on the base layer tile; assign the determined aggregate sensor data to the corresponding one or more aggregate tiles; and output the one or more aggregate tiles.

20 Claims, 6 Drawing Sheets

(56) References Cited

OTHER PUBLICATIONS

Matthias Keller et al., "Visualizing Large Sensor Network Data Sets in Space and Time with Vizzly", Local Computer Networks Workshops (LCN Workshops), 2012 IEEE 37th Conference, Oct. 22, 2012, 9 pages.

* cited by examiner

SENSOR DATA ANALYSIS SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to methods and systems for aggregating sensor data. More particularly, this disclosure relates to methods and systems for aggregating sensor data in real time.

BACKGROUND

Distributed sensor arrays are often used to collect data about a system or environment in real time. These sensor arrays may often comprise thousands, or even tens-of-thousands, of sensors, generating extremely large amounts of sensor data. The volume of sensor data produced can result in challenges when analysing the data.

While it is often useful to have access to individual sensor's sensor data, often aggregate sensor data is more useful for analysis of the environment/system being monitored by the sensors. However, the sensor data corresponding, for example, to a particular time may not be received from all sensors simultaneously, resulting in difficulty maintaining and updating aggregates in real time.

SUMMARY

According to a first aspect, this disclosure describes a data aggregation system comprising: a plurality of sensors distributed throughout an environment; a tile database comprising a memory for storing a hierarchy of tiled layers, wherein each layer in the hierarchy of tiled layers comprises a plurality of tiles; a tiling server, the tiling server configured to: receive sensor data from one or more sensors in the plurality of sensors; assign the sensor data to a base tile in a first layer in the hierarchy of tiled layers based on one or more properties of the one or more sensors; retrieve one or more aggregate tiles from the tile database based on an identity of the base tile in the first layer, the one or more aggregate tiles each taken from one or more further layers in the hierarchy of tiled layers; determine aggregate sensor data for each of the retrieved one or more aggregate tiles based on the sensor data stored on the base layer tile; assign the determined aggregate sensor data to the corresponding one or more aggregate tiles; and output the one or more aggregate tiles.

Each of the plurality of sensors may capture sensor data in substantially real time.

Assigned sensor data may be written to the first layer of tiles in the memory of the tile database by the tiling server.

The tiling server may comprise a cache memory for storing a plurality of aggregate tiles after assigning aggregate data to those aggregate tiles. The tiling server may be further configured to flag the retrieved one or more aggregate tiles in the tile database to indicate that the retrieved aggregate tiles are in the cache memory.

The tiling server may be further configured to write one or more of the aggregate tiles stored in the cache memory to the memory of the tile database when one or more predefined conditions are satisfied.

The one or more predefined conditions may comprise one or more of: the cache memory storing a predefined number of tiles; the cache memory being full to at least a predefined fraction; and/or a predefined period of time.

The system may further comprise a user interface configured to request one or more aggregate tiles from the tiling server, wherein outputting the aggregate sensor data comprises outputting one or more aggregate tiles from a layer in the hierarchy of tiled layers to the user interface for display.

The user interface may be further configured to request, in response to a user input, one or more aggregate tiles from a different layer in the hierarchy of tiled layers, and wherein the tiling server is configured to output one or more aggregate tiles from the different layer in the hierarchy of tiled layers to the user interface for display.

Aggregating the sensor data may comprise: averaging the sensor data on a tile; determining the maximum value of sensor data on a tile; determining the minimum value of sensor data on a tile; determining a sum of the sensor data on a tile; and/or determining a derivative of the sensor data on a tile.

The plurality of sensors may comprise one or more of: a temperature sensor; an acoustic sensor; an electromagnetic sensor; a seismic sensor; an optical sensor; a pressure sensor; and/or a flow sensor.

Each of the base tiles and aggregate tiles may comprise a two-dimensional array of data points. The two-dimensional array of data points may correspond to: a two dimensional array of sensors; a two-dimensional slice of a three dimensional array of sensors; or a one dimensional array of sensors at a sequence of times.

Each layer in the hierarchy of tiled layers may be representative of sensor data aggregated on a different spatial and/or temporal scale.

According to a second aspect, this disclosure describes a method of aggregating sensor data using a hierarchy of tiled layers, the method comprising: receiving sensor data from one or more sensors in the plurality of sensors; assigning the sensor data to a base tile in a first layer in the hierarchy of tiled layers based on one or more properties of the one or more sensors; retrieving one or more aggregate tiles from a tile database based on an identity of the base tile in the first layer, the one or more aggregate tiles each taken from one or more further layers in the hierarchy of tiled layers; determining aggregate sensor data for each of the retrieved one or more aggregate tiles based on the sensor data stored on the base layer tile; assigning the determined aggregate sensor data to the corresponding one or more aggregate tiles; and outputting the one or more aggregate tiles.

The plurality of sensors may capture sensor data in substantially real time.

The assigned sensor data may be written to the first layer of tiles in a memory of a tile database.

The method may further comprise storing a plurality of aggregate tiles in a cache memory after assigning aggregate data to those aggregate tiles.

The method may further comprise flagging the retrieved one or more aggregate tiles in the tile database to indicate that the retrieved aggregate tiles are in the cache memory.

The method may further comprise writing one or more of the aggregate tiles stored in the cache memory to the memory of a tile database when one or more predefined conditions are satisfied.

The one or more predefined conditions may comprise one or more of: the cache memory storing a predefined number of tiles; the cache memory being full to at least a predefined fraction; and/or a predefined period of time.

The method may further comprise requesting, via a user interface, one or more aggregate tiles, wherein outputting the aggregate sensor data comprises outputting one or more aggregate tiles from a layer in the hierarchy of tiled layers to the user interface for display. The method may further comprise: requesting, in response to a user input of the user interface, one or more aggregate tiles from a different layer in the hierarchy of tiled layers; and outputting one or more aggregate tiles from the different layer in the hierarchy of tiled layers to the user interface for display.

Aggregating the sensor data may comprise: averaging the sensor data on a tile; determining the maximum value of sensor data on a tile; determining the minimum value of sensor data on a tile; determining a sum of the sensor data on a tile; and/or determining a derivative of the sensor data on a tile.

The plurality of sensors may comprise one or more of: a temperature sensor; an acoustic sensor; an electromagnetic sensor; a seismic sensor; an optical sensor; a pressure sensor; and/or a flow sensor.

Each of the base tiles and aggregate tiles may comprise a two-dimensional array of data points. The two-dimensional array of data points may correspond to: a two dimensional array of sensors; a two-dimensional slice of a three dimensional array of sensors; or a one dimensional array of sensors at a sequence of times.

Each layer in the hierarchy of tiled layers may be representative of sensor data aggregated on a different spatial and/or temporal scale.

According to a third aspect, this disclosure describes a computer readable medium comprising computer readable code that, when executed by a computing apparatus, causes the apparatus to perform the method of any of aspects described above.

According to a fourth aspect, this disclosure describes apparatus comprising: one or more processors; a memory, the memory comprising computer readable code that, when executed by the one or more processors, causes the apparatus to perform the method of any of aspects described above.

BRIEF DESCRIPTION OF THE DRAWINGS

Example embodiments will now be described by way of non-limiting example with reference to the accompanying drawings, in which.

DETAILED DESCRIPTION

Reference will now be made in detail to implementations, examples of which are illustrated in the accompanying drawings.

Figure 1:
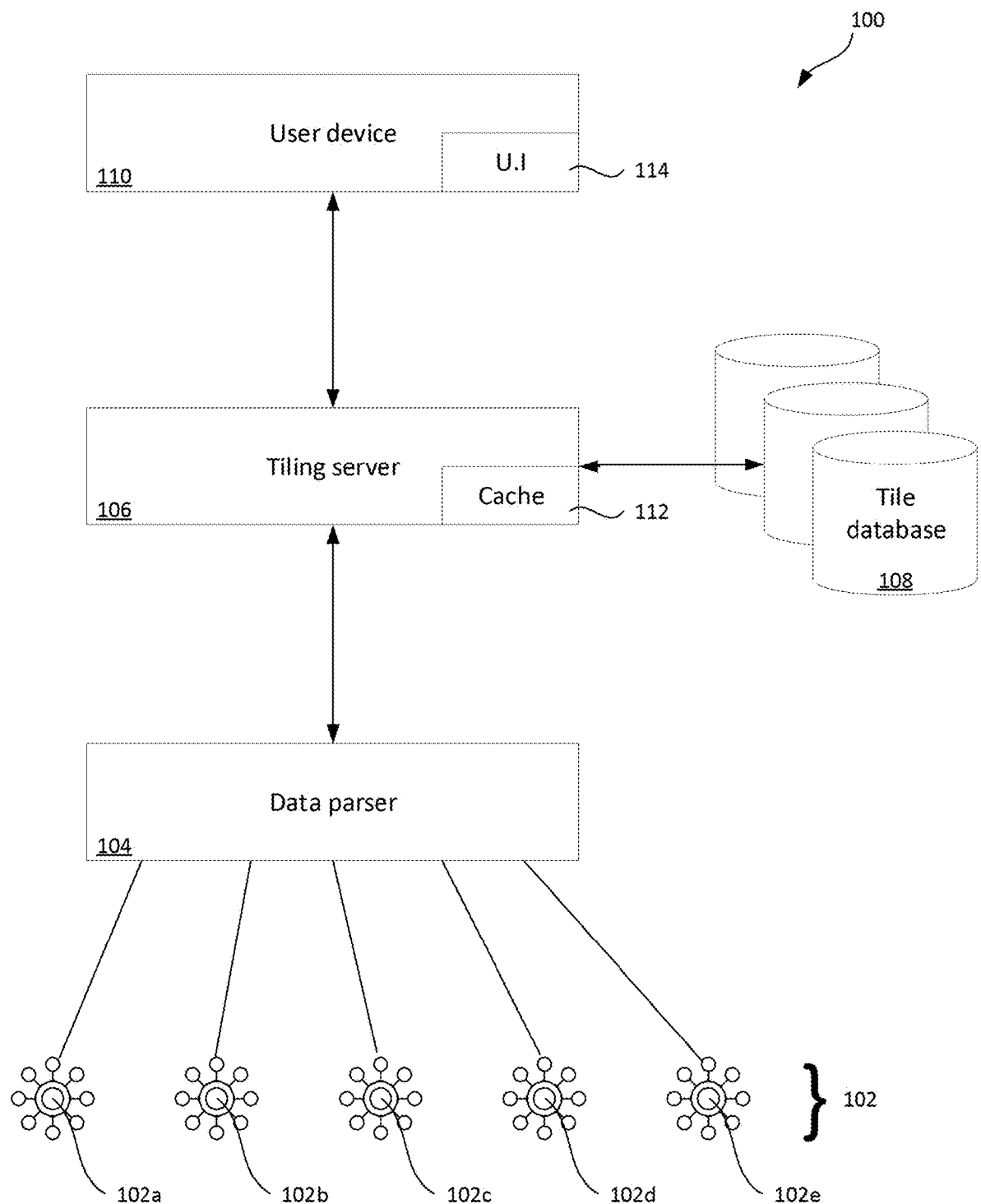
FIG. 1 shows an example of a system for aggregating sensor data.

FIG. 1 shows an example of a system for aggregating sensor data. The system 100 comprises a plurality of sensors 102a-e for collecting sensor data, a data parser 104 for receiving raw sensor data and parsing it, a tiling server 106 for managing creation and modification of tiles, a tile database 108 for storing captured sensor data and tiles, and a user device 110 for interacting with the captured data.

The system uses a hierarchy of tiled layers to manage received sensor data. The layers in the hierarchy of tiled layers each correspond to aggregates of sensor data on different spatial and/or temporal scales. This allows a user to quickly switch between scales when interacting with the data, without the need to re-compute aggregates each time scale is changed, thereby reducing latency. The tiled structure described herein further allows aggregates to be updated when new sensor data is received, without have to re-compute aggregates that do not depend on the newly received sensor data. This can be advantageous when sensor data is received asynchronously. All this can contribute to an increase in the speed of serving aggregates of sensor data in real time.

The system captures sensor data from the plurality of sensors 102. The sensors may comprise a distributed sensor network, comprising a plurality of sensors 102 that are spatially distributed throughout an environment. The sensor data may be captured in real time. For example, the sensors may be configured to capture sensor data continuously. In other examples, the sensors may be configured to capture sensor data periodically. The sensors may capture sensor data every time a pre-set period of elapses, for example, every second, every few seconds, every minute etc. In other examples, sensors 103 may captured sensor data when a predetermined event is detected, such as, for example, a value of a quantity being monitored by the sensor exceeding some predefined value.

The plurality of sensors 102 are distributed throughout one or more environments. Each sensor in the plurality of sensors 102 may be associated with one or more properties that may be used to identify the sensor. For example, each sensor may be associated with a sensor position, identifying its physical and/or relative location in an environment. The sensor position may comprise one or more co-ordinates that refer to a physical location of the sensor. Examples of such co-coordinates include, but are not limited to, one or more of: a depth; an altitude; a latitude; a longitude; co-ordinates relative to a pre-defined reference frame; and/or angular positions. In some examples, the sensor position may be given by an integer indexing the position of the sensor in an array and/or sequence of sensors. For example, the sensors may be arranged in a one-dimensional array, with an integer labelling the order of the sensors in the array. Sensor properties may also include an identification number for each sensor.

The plurality of sensors 102 sense, and provide outputs indicative of, one or more physical properties. The plurality of sensors 102 may comprise one or more of: temperature sensors; acoustic sensors; electromagnetic sensors; seismic sensors; optical sensors; pressure sensors; and/or flow sensors. Each sensor in the plurality of sensors may itself, in some examples, comprise multiple sensors working in concert, such as a cluster of sensors.

The sensors may be arranged in an array of sensors. The array may, for example, be a one-dimensional array arranged along line. Examples of one-dimensional arrays of sensors include, but are not limited to: an array of sensors arranged along the depth of a hole, such as a mineshaft or borehole; an array of atmospheric sensors, each provided a different altitude; an array of oceanographic sensors, each arranged a different depth on a body of water; or an array of traffic sensors arranged along a road. It will be appreciated that the one-dimensional array of sensors does not have to be arranged linearly, but may be arranged in any shape that can be represented as a one-dimensional array. In other examples, the array may be a two-dimensional array or a three-dimensional array.

The data parser 104 is configured to receive a stream of sensor data from the plurality of sensors 102 and parse the received sensor data. The sensor data may be received from the sensors via a network, such as the Internet or a local area network. The data parser 104 performs pre-processing on the sensor data. For example, the sensor data may arrive as raw sensor data in one or more formats. The data parser may then convert the raw sensor data into a format that is usable by the rest of the system. The sensor data may be received as fibre data files through streaming http endpoints. In some examples, the data parser may be integrated into the tiling server 106, such that the tiling server 106 provides the functionality of the data parser 104.

The data parser may receive a continuous stream of data from the plurality of sensors 102. The stream may arrive in substantially real time. The data parser 104 may be configured to isolate sensor data belonging to each sensor from the data stream and process sensor data in the stream.

In some examples, the data parser 104 receives the sensor data in one or more packets, the data packets comprising sensor data from one or more of the plurality of sensors 102. The data packets may be received periodically from one or more of the plurality of sensors 102. The data parser 104 may unpack these packets and determine the identity of the sensors from which the data was received.

The sensor data may not necessarily be received in the temporal order in which it was captured. For example, system latency may cause delays in the receipt of sensor data from one or more sensors. Errors and/or malfunctions of sensors may cause delays in the receipt of sensor data. In some examples, the sensors may be configured to send the sensor data asynchronously as part of the system design. The hierarchy of tiled layers allows aggregates of such sensor data to be determined/modified without adversely affecting the system performance even when the sensor data is received out of order.

Other examples of pre-processing that may be performed by the data parser 104 include, but are not limited to, decoding the received sensor data; de-compressing the received sensor data; and/or identifying errors in the sensor data.

In some examples, the data parser may be configured to identify a base layer tiles in a first layer of tiles that correspond to the received sensor data. The sensor data may be written to the identified tiles and stored in the tile database 108. The raw sensor data may, in effect, be considered the base layer of the hierarchy of tiled layers.

The tiling server 106 is configured to receive sensor data from the data parser 104 and assign the sensor data to one or more base tiles in a first layer comprising a plurality of tiles. The sensor data may be written to the identified tiles and stored in the tile database 108. This may allow for higher level layers to be reconstructed in the event that the tiling server crashes. However, in other examples, this assignment may be performed by the data parser 104 as described above. When new sensor data is received, it is written to base tiles in the first layer. From the identity of these base tiles, the aggregate tiles that depend on it are identified and retrieved from persistent storage. These tiles are then updated with the relevant aggregates, for example in a cache memory 112 of the tiling server 106.

Sensor data is stored on "base tiles" in a first layer of tiles that corresponds to the plurality of sensors 102. Each base tile represents data from a plurality of sensors in some spatial and/or temporal range. Each base tile comprises a two-dimensional grid of data points that corresponds to a subset of the plurality of sensors 102 and/or sensor measurements. Examples of base layers are described in further detail below in relation to FIG. 2.

Assigning the sensor data to one or more base tiles in the first layer may comprise identifying which base tiles correspond to the received sensor data based on the properties of the sensors that captured the sensor data. For example, a base tile may be selected at least in part in dependence on a position of the sensor from which a piece of sensor data originated. Assigning the sensor data to one or more base tiles in the first layer may comprise identifying a time that the sensor data was captured. For example, one axis of data points in the base layer may be a temporal axis.

Assigning the sensor data to one or more base tiles in the first layer may comprise: adding a new data point to the base-layer tile; replacing a previous data point in the base layer tile; updating a data point in the base layer tile; adding and/or subtracting data to a data point in the base layer tile; and/or modifying a data point in the base layer tile.

The tiling server 106 is further configured to aggregate sensor data from tiles in the base layer. Aggregating the sensor data may comprise one or more of: averaging the sensor data on a tile; determining the maximum value of sensor data on a tile; determining the minimum value of sensor data on a tile; determining a sum of the sensor data on a tile; and/or determining a derivative of the sensor data on a tile.

The tiling server 106 is configured to identify aggregate tiles that correspond to the aggregate sensor data. A number of layers of aggregate tiles are stored in the tile database 108 in a sequence of hierarchical layers. Each aggregate tile in a layer corresponds to a plurality of tiles in a previous layer. Each point in an aggregate tile corresponds to the aggregate of a tile in the previous layer.

When the tiling server 106 assigns sensor data to a base layer tile, it identifies aggregate tiles in the sequence of hierarchical layers that depend on that base layer tile (see, for example, FIG. 2 and the associated description below). One aggregate tile is identified per layer (or per sub-layer, if present). The identified aggregate tiles are retrieved by the tiling server 106 from the tile database 108. The retrieved aggregate tiles may be placed into the cache 112 of the tiling server 106, and flags placed in the tile database 108 to indicate that the retrieved aggregate tiles are being processed/updated by the tiling server 106.

The aggregate of sensor data from the base layer tile is assigned to the identified aggregate tile in the second layer (i.e. the first layer of aggregate tiles) that depends on that base layer tile. The tiling server 106 then aggregates the aggregate data from the aggregate tile in the second layer, and assigns this to the identified aggregate tile in the third layer (i.e. the second layer of aggregate tiles) that depends on that base layer tile. This process is repeated for each layer of tiles until all the tiles in the sequence of identified tiles have been updated with aggregate data.

The tiling server 106 is also configured to output the aggregate tiles. The tiles may, for example, be output to the persistent tile database 108 and/or to the cache memory 112 of the tiling server 106. The aggregate tiles may be output to a user device 110 for a user to interact with them. The aggregate tiles may be output in response to a request from the user device, i.e. a "pull" from the user device 110. Alternatively or additionally, aggregate tiles may be output to the user device 110 without the user device requesting them, i.e. a "push" from the tiling server 106.

The cache memory 112 stores the tiles currently being modified and, in some examples, recently modified and/or served aggregate tiles that have not yet been returned to the tile database 108. In some embodiments, the modified values of data points on the tiles may be stored in the cache memory 112 as a difference ("diff") between what the tiles should be and what the tiles values currently stored in the tile database 108 are. In other embodiments, the full modified tile may be stored in the cache memory 112.

The tiling server may be configured to write modified aggregate tiles from the cache 112 to the memory of the tile database in dependence on one or more pre-defined conditions. The pre-defined conditions may comprise one or more of: the cache memory reaching a predefined number of stored tiles; the cache memory being full to at least a predefined fraction; shutdown of the tiling server 106; and/or a predefined period of time.

The tiling server 106 may be responsible for making sure that tiles are always up to date. This may be achieved by storing, in the tiling server 106, a difference ("diff") of what the tiles should be and what the tiles values currently stored in the tile database 108 are. These diffs are applied to the tiles in the tile database 108 periodically. The diff may be stored in the cache memory 112. The tiling database 108 may store seeds of the diffs necessary to rebuild it in the case of unexpected server death.

The tile database 108 comprises a data repository that stores the layers of tiles in a persistent storage/memory. The data repository may be a distributed data repository, with the datasets comprising the data repository being stored at a plurality of locations. One or more of the datasets may be under control of one or more different entities. The datasets may be edited by the entities that control them, for example to update the data in the dataset in light of new sensor measurements.

The tiles that are being edited and/or updated by the tiling server 106 (or that have recently been edited and/or updated) may be flagged in the persistent storage/memory of the tile database 108 as currently being in the cache 112 of the tiling server. A request to serve that data from that tile can therefore to retrieve it from the cache 112.

The system may further comprise one or more user devices 110. A user device 110 may, for example, be in the form of a remote computing device. A user may interact with the received sensor data and/or its aggregates through a user interface 114 of the user device 110. The user may request aggregate sensor data at a particular spatial and/or temporal scale via the user device 110. The user device 110 sends a request to the tiling server 106 to serve tiles corresponding to the requested aggregate sensor data. The tiling server 106 retrieves the requested tiles, either from the cache memory of the tiling server 106 or the memory of the tiling database 108 in dependence on where the latest version of the tile is stored, and sends them to the user device 110. The user may then view the requested tiles through the user interface 114 of the user device 110. An example of a user interface will be described below in relation to FIG. 5.

The system can be used by multiple users at once, each interacting with the system through a user interface on a different user device 110. Where multiple users attempt to edit a dataset at the same time, vector clocks and resolution strategies can be used to resolve the conflicts.

Figure 2:
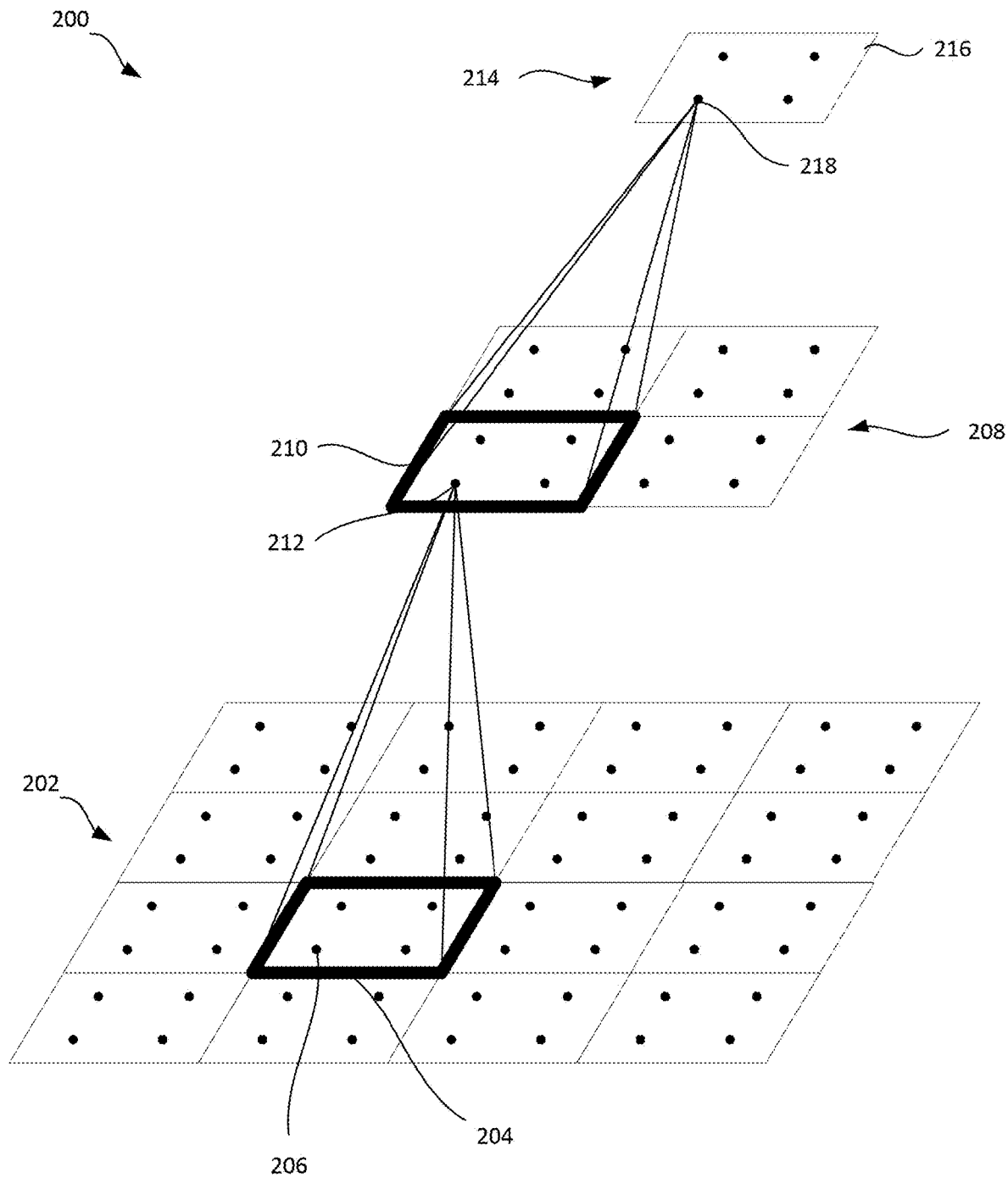
FIG. 2 shows an example of a layered data structure comprising a hierarchy of tiled layers.

FIG. 2 shows an example of a hierarchy of tiled layers. The hierarchy of tiled layers 200 comprises a plurality of layers 202, 208, 212, each comprising one or more tiles 204, 210, 216. Each of the tiles 204, 210, 216 comprises a plurality of sensory data points 206, 212, 218.

The plurality of layers comprises a first layer 202 (herein also referred to as a base layer) comprising a plurality of sensory data points 206. The sensory data points 206 are arranged in a two-dimensional array/grid/lattice. The first layer is divided into a plurality of base layer tiles 204, each of which comprises a plurality of sensory data points 206. Raw sensor data received by the tiling server 106 is assigned to base layer tiles 204 by the tiling server 106 (and/or the data parser 104) in dependence on one or more properties of the sensors from which the data were received. In some embodiments, each base layer tile corresponds to the same number of sensory data points 206. In other embodiments, at least some of tiles may correspond to a different number of sensory data points than other tiles in the first layer.

In some embodiments, the first layer may correspond to two-dimensional spatial positions of the sensors 102. The base layer tiles 204 may each correspond to a plurality of nearby sensors 102. In other examples, the first layer may correspond to one spatial dimension and one temporal direction. For example, one axis of the layer may correspond to a one-dimensional position of sensors 102, such as sensors arranges along a road or along the depth of a hole, or one axis of a two-dimensional grid of sensors. The other axis may be a temporal axis corresponding to the time that sensor data was captured.

The plurality of layers further comprises one or more aggregate layers 208, 214. The aggregate layers may be referred to as "further layers" and/or "higher layers". In the example shown, two aggregate layers are shown, but fewer or greater numbers of aggregate layers may be present. The each aggregate layer is divided into a plurality of aggregate tiles 210, 216, each of which comprises a plurality of aggregate data points 212, 218. Each aggregate data point 212, 218 corresponds to an aggregate of data from a tile in a previous layer. The aggregate may comprise one or more of: averaging the sensor data on a tile in the previous layer; determining the maximum value of sensor data on a tile in the previous layer; determining the minimum value of sensor data on a tile in the previous layer; determining a sum of the sensor data on a tile in the previous layer; and/or determining a derivative (e.g. a discrete gradient) of the sensor data on a tile in the previous layer.

For example, a first aggregate layer 208 (also referred to herein as a second layer) comprises a plurality of aggregate tiles 210. The aggregate data points 212 in each aggregate tile 210 correspond to an aggregate of sensory data stored on a base layer tile 206 in the base layer 202. One or more further aggregate layers 214 may also be present, each of which comprises a plurality of higher level aggregate tiles 212. The aggregate data points 212 in each higher level aggregate tile 212 correspond to an aggregate of aggregate data stored on an aggregate tile 210 in the previous layer 208. The layers therefore form a hierarchy of tiled layers, each of which contains aggregates of data from a previous layer. The use of tiles allows data aggregates to be efficiently updated without substantially slowing down the serving of aggregate sensor data in response to a request.

In some examples, each layer in the hierarchy of tiled layers may comprise two or more sub-layers. Each sub-layer comprises a plurality of tiles in the same way as the layers described above. Sub-layers may represent a different plurality of sensors arranged in the same environment as the plurality of sensors 102, but that measure different quantities. For example, a first sub-layer may correspond to temperature sensors arranged throughout an environment, while a second sub-layer may correspond to pressure sensors arranged throughout the same environment. Additional sub-layers may correspond to other sensor types in the same environment. The sub-layers may correspond to any combination of sensors in the environment. When aggregate tiles are modified, aggregate tiles in one or more of the sublayers of each layer may be modified.

In some embodiments, the sub-layers may correspond to spatial and/or temporal slices through sensor data collected by the plurality of sensors. For example, if the sensors form a three-dimensional array, each sub-layer may correspond to a two-dimensional slice of the sensors. If the sensors form a two-dimensional array, each sub-layer may correspond to a sensor data obtained within a particular time range. Alternatively, if the sensors form a two-dimensional array, each sub-layer may correspond to a one-dimensional slice of the two-dimensional array across a range of times (i.e. each layer comprises a temporal axis and a one-dimensional spatial axis).

Figure 3:
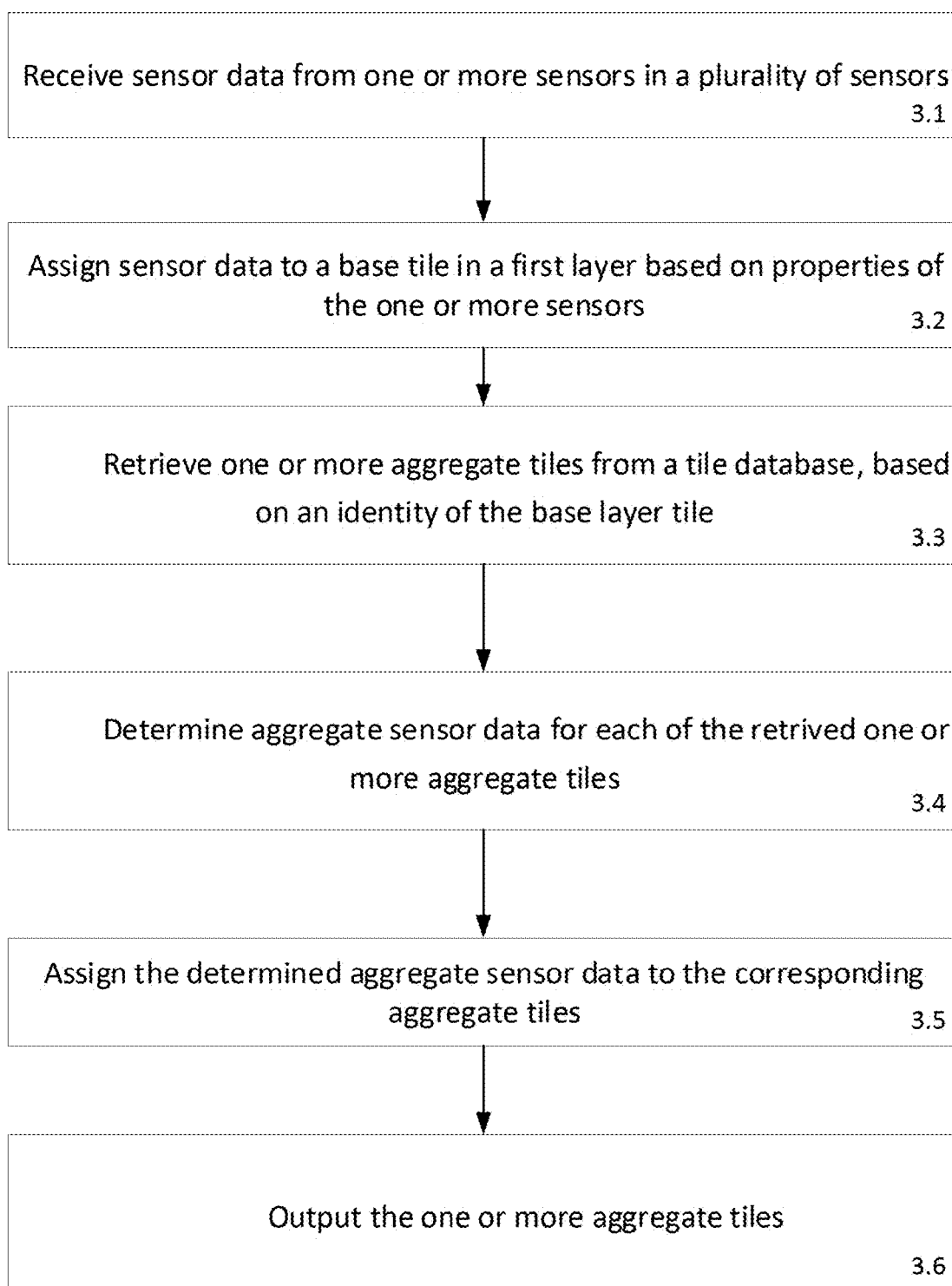
FIG. 3 shows a flow chart of an example of a method of using a sensor data aggregation and processing system.

FIG. 3 shows an example of a method of using a sensor data aggregation and processing system. The method may, for example, be performed by the system 100 described in FIG. 1. The method may be performed by the tiling server 106.

At operation 3.1, sensor data is received from one or more sensors in a plurality of sensors 102. The sensor data may be received in substantially real time. For example, it may be received as a continuous stream of sensor data from the plurality of sensors. In other examples, the sensor data is received periodically in packets of sensor data, which are unpacked.

The sensor data may not necessarily be received in the temporal order in which it was captured. For example, system latency may cause delays in the receipt of sensor data from one or more sensors. Errors and/or malfunctions of sensors may cause delays in the receipt of sensor data. In some examples, the sensors may be configured to send the sensor data asynchronously as part of the system design.

At operation 3.2, the sensor data is assigned to a base tile in a first layer of the hierarchy of tiled layers based on one or more properties of the sensor. Assigning the sensor data to the base layer tile comprises modifying one or more data points on the base layer tile using the received sensor data. The tile corresponding to a particular set of sensor data may, for example, be identified based on one or more of: a location of the sensor from which it was captured; a time at which the sensor data was captured; and/or the identity of the sensor that captured the sensor data.

At operation 3.3, one or more aggregate tiles are retrieved from a tile database 108 based on an identity of the tile in the first layer. The aggregate tiles whose aggregates depend on the base layer tile that has been modified are retrieved from a memory of the tile database 108. For example, an aggregate tile in a second layer in the hierarchy of tiled layers that comprises a data point corresponding to an aggregate of the data points on the base layer tile may be retrieved. An aggregate tile from a third layer that comprises a data point corresponding to an aggregate of the aggregate tile in the second layer may also be retrieved. Aggregate tiles from further layers, each comprising a data point that corresponds to an aggregate of a tile in the previous layer may be retrieved. Once retrieved, the identified aggregate tiles are stored in the cache memory 112 of the tiling server 106 while being modified and, in some embodiments, after being modified. Data points from the sensors 102 may, in some embodiments, arrive in temporal (or near temporal) order, so keeping the identified aggregate tile in the cache memory after the modification allows the identified aggregate tile to be quickly modified. Furthermore, in some embodiments, the probability of a recently modified tile being modified again soon is higher than for unmodified tiles.

At operation 3.4, aggregate sensor data is determined for each of the retrieved one or more tiles. At operation 3.5, the determined aggregate sensor data is assigned to corresponding retrieved aggregate tiles. An aggregate of the data points on the base tile is determined, and assigned to the corresponding data point in the aggregate tile in the second layer. An aggregate of the data points on the aggregate tile in the second layer is then determined, and assigned to the corresponding data point in the aggregate tile in the third layer. This process is repeated for each of the retrieved aggregate tiles, i.e. for each retrieved aggregate tile, a data point in that aggregate tile is modified with an aggregate of data from a tile in the previous layer of the hierarchy of tiled layers.

At operation 3.6, the one or more aggregate tiles are output. The tiles may, for example, be output to the memory of the tile database 108 and/or to a cache memory 112 of the tiling server 106. The aggregate tiles may be output to a user interface 114 of a user device 110 for a user to interact with them in response to a request from the user interface.

Figure 4:
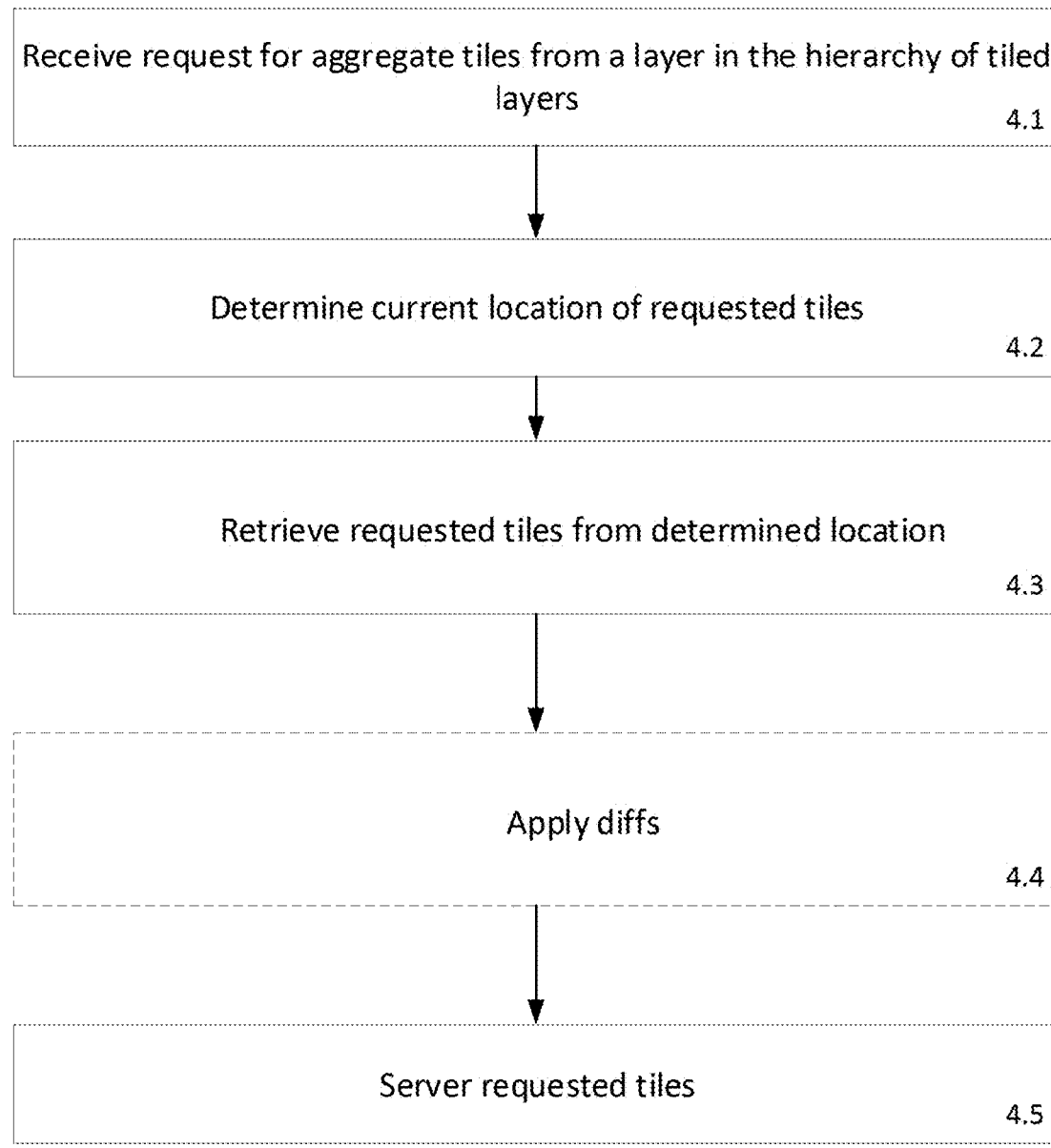
FIG. 4 shows a flow chart of an example method for requesting sensor data.

FIG. 4 shows a flow chart of an example method for requesting sensor data. The method may, for example, be performed by the system 100 of FIG. 1.

At operation 4.1, a request for aggregate tiles from a particular layer in the hierarchy of tiled layers is received from a requesting entity. The request may be received from the user device 110, for example in response to a user input. The user input may indicate that the user wishes to view/interact with the sensor data on a particular spatial and/or temporal scale, e.g. a different temporal and/or spatial scale than the user is currently interacting with the data at.

At operation 4.2, the location of the requested tiles is determined. The requested tiles may be distributed throughout the system. For example, one or more of the requested tiles may be in a tiling database 108. One or more of the requested tiles may be in the cache 112 of the tiling server 106. One or more of the requested tiles may be stored in a tiling database 108, but have corresponding diffs stored in the cache 112 of the tiling server. The location of the requested tiles may be determined, for example, based on a look up table. The location of the requested tiles may be determined, for example, based on a flags stored in the tile database. Many other methods for determining the location of the requested tiles are possible.

At operation 4.3, the requested tiles are retrieved from the determined location. The retrieved tiles may be stored in a cache memory 112 of the tiling server 106 temporarily.

At optional operation 4.4, one or more diffs may be applied to the retrieved tiles. If the requested tiles have diffs stored in the cache memory 112 of the tiling server 106, these are applied to the retrieved tiles in order to generate an up-to-date version of the requested tiles.

At operation 4.5, the requested tiles are served to the requesting entity, e.g. the user device 110. Once the tiles have been served, the user device 110 may use the tiles to create an interactive graphical user interface (GUI) comprising the tiles. The tiles may be used to "tile" a part of the user interface 114 to create the GUI, thereby allowing a user to analyse the data at a particular spatial and/or temporal scale.

Figure 5:
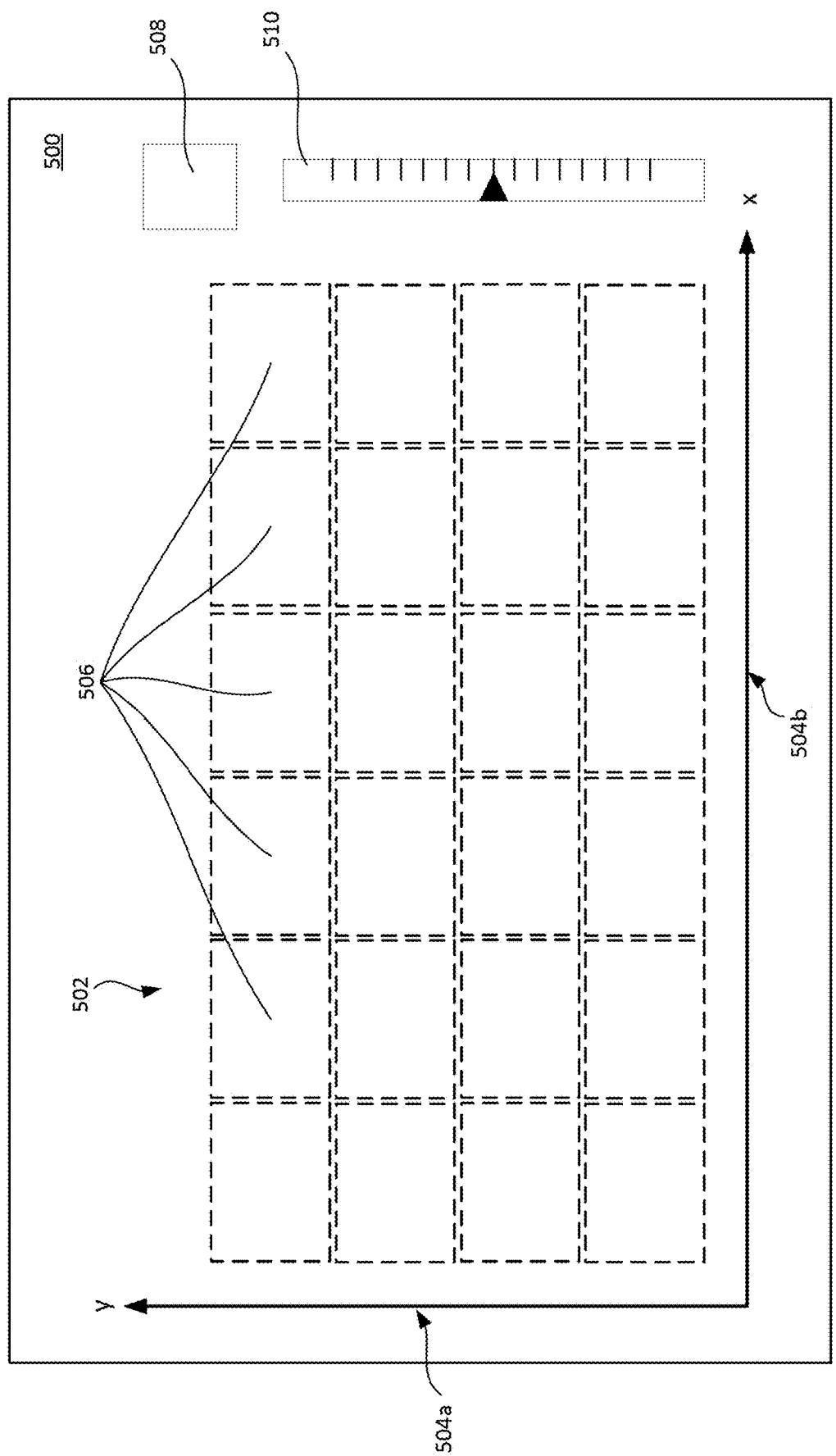
FIG. 5 shows a block diagram of an exemplary computer system.

FIG. 5 shows a schematic example of a graphical user interface of a user device 110. The graphical user interface 500 may be displayed on the user device 110 as part of the user interface 114.

The graphical user interface 500 comprises a graph 502 of sensor data on a particular spatial and/or temporal scale. The graph 502 comprises two axes 504a, 504b. Each axis may, for example, be a spatial and/or a temporal axis. The graph is formed from a plurality of tiles 506 (only a sub-set of which have been labelled in FIG. 5) arranged to display the data contained on those tiles. The tiles 506 comprise tiles from a layer in the hierarchy of tiled layers. For example, if the user has requested to view the graph 502 on a spatial or temporal scale corresponding to the base layer, the graph 502 is formed from a plurality of tiles 506 taken from the base layer. If the user has requested to view the graph 502 on a spatial or temporal scale corresponding to one of the aggregate layers, the graph 502 is formed from a plurality of tiles 506 taken from that aggregate layer.

The data on the tiles may be displayed in any suitable form. For example, the data may be displayed as: a heat map; a contour map; a three-dimensional bar graph; a colour map; an image; and/or a three dimensional surface.

The tiles forming the graph may be updated in real time as the tiling server 106 updates the tiles in the hierarchy of tiled layers on the basis of received sensor data.

The graphical user interface may further comprise a menu button 508. The menu button 508 may provide a menu of options for interacting with the displayed graph 502. The menu may, for example, be in the form of an overlay and/or a drop-down menu. Options provided by the menu may include one or more of: changing the type of graph displayed; changing the range of one or more of the axes; switching to a different layer/sub-layer of the hierarchy of tiled layers; saving the graph; and/or altering display options. Many other examples are possible.

The graphical user interface may further comprise a layer interface 510. The layer interface 510 may allow the user to select a layer within the hierarchy of tiled layers for display, i.e. to zoom in and/or zoom out of the displayed graph to view aggregate data on different spatial and/or temporal scales. The layer interface 510 may display an indication of the current layer being displayed and/or one or more available layers that can be switched to. A user may switch between layers in the hierarchy of tiled layers by, for example, selecting a particular layer on the layer interface 510 and/or by scrolling a mouse wheel. Many other examples are possible.

Figure 6:
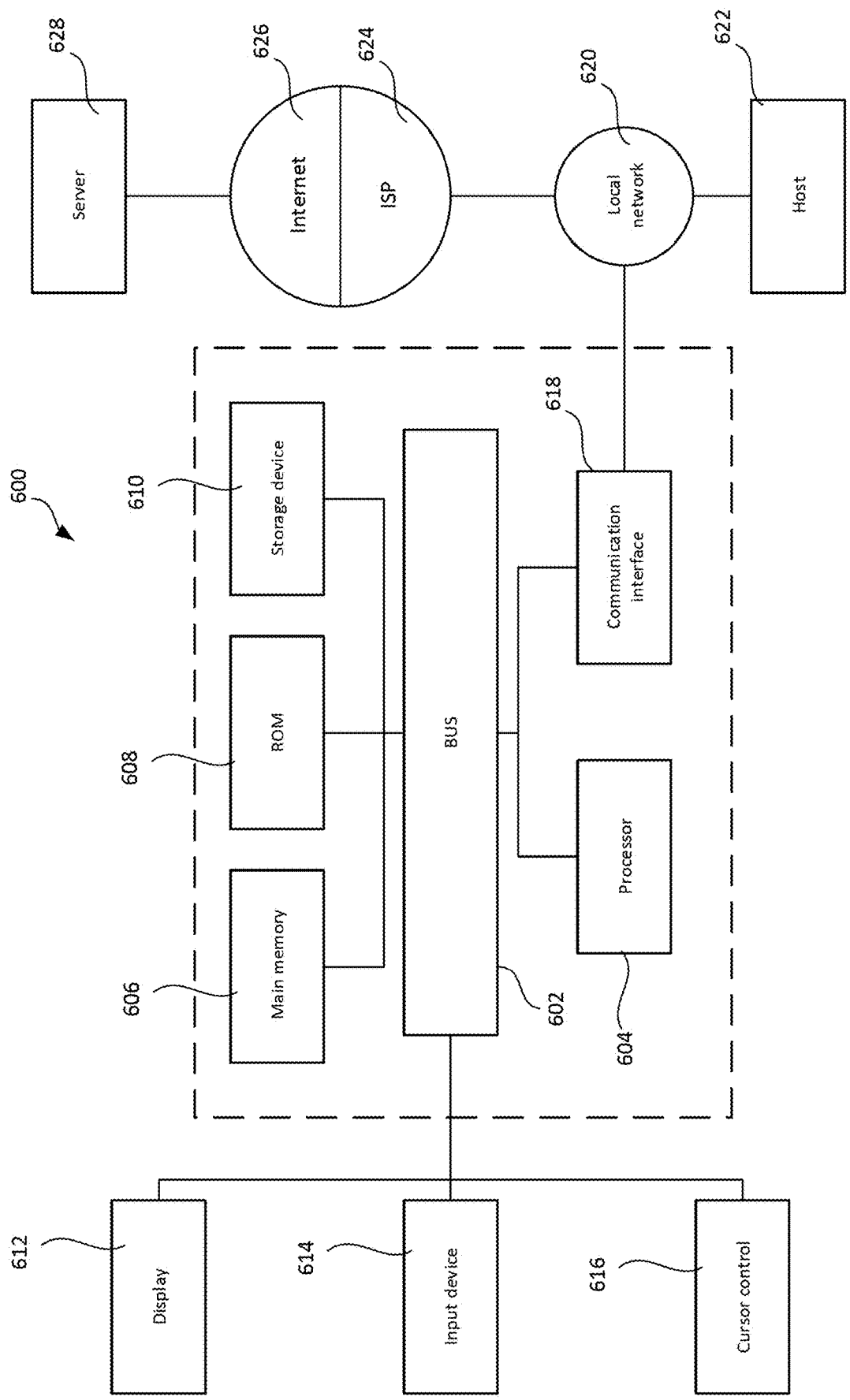
FIG. 6 shows an example computer system by which certain functionality described herein may be implemented.

Referring to FIG. 6, a block diagram of an exemplary computer system, which may comprise the data parser 104, the tiling server 106, the tile database 108 and/or the user device 110, consistent with examples of the present specification is shown.

Computer system 600 includes a bus 602 or other communication mechanism for communicating information, and a hardware processor 604 coupled with bus for processing information. Hardware processor 604 can be, for example, a general purpose microprocessor. Hardware processor 604 comprises electrical circuitry.

Computer system 600 includes a main memory 606, such as a random access memory (RAM) or other dynamic storage device, which is coupled to the bus for storing information and instructions to be executed by processor. The main memory 606 can also be used for storing temporary variables or other intermediate information during execution of instructions by the processor 604. Such instructions, when stored in non-transitory storage media accessible to the processor, render the computer system 300 into a special-purpose machine that is customized to perform the operations specified in the instructions. The main memory 606 may be referred to as volatile memory.

Computer system 600 further includes a read only memory (ROM) 608 or other static storage device 610 coupled to the bus for storing static information and instructions for the processor 604. A storage device 610, such as a magnetic disk or optical disk, is provided and coupled to the bus for storing information and instructions.

Computer system 600 can be coupled via the bus to a display 612, such as a cathode ray tube (CRT), liquid crystal display, or touch screen, for displaying information to a user. An input device 614, including alphanumeric and other keys, is coupled to the bus 602 for communicating information and command selections to the processor 604. Another type of user input device is cursor control 616, for example using a mouse, a trackball, or cursor direction keys for communicating direction information and command selections to the processor and for controlling cursor movement on the display. The input device 616 typically has two degrees of freedom in two axes, a first axis (for example, x) and a second axis (for example, y), that allows the device to specify positions in a plane.

Computer system 600 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 618 coupled to the bus 602. The communication interface provides a two-way data communication coupling to a network link that is connected to a local network 620. For example, the communication interface can be an integrated services digital network (ISDN) card, cable modem, satellite modem, or a modem to provide a data communication connection to a corresponding type of telephone line. As another example, the communication interface 618 can be a local area network (LAN) card to provide a data communication connection to a compatible LAN. Wireless links can also be implemented. In any such implementation, the communication interface 518 sends and receives electrical, electromagnetic or optical signals that carry digital data streams representing various types of information.

The network link typically provides data communication through one or more networks to other data devices. For example, the network link can provide a connection through the local network 620 to a host computer 622 or to data equipment operated by an Internet Service Provider (ISP) 624. The ISP 624 in turn provides data communication services through the world wide packet data communication network now commonly referred to as the "Internet" 626. The local network 620 and internet 626 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 628.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

What is claimed is:

1. A data aggregation system comprising:
a plurality of sensors distributed throughout an environment;
a tile database comprising a memory for storing a hierarchy of tiled layers, wherein:
   each layer in the hierarchy of tiled layers comprises a plurality of tiles,
   a first layer of the hierarchy of tiled layers comprises a plurality of base tiles, each base tile associated with sensor data from a plurality of sensors in at least one of a spatial range or a temporal range, and
   a plurality of further layers of the hierarchy of tiled layers comprise aggregate tiles, each layer of aggregate tiles depending on one or more tiles in a previous layer of the hierarchy of tiled layers;
a tiling server comprising one or more processors and computer-executable instructions, the one or more processors configured to execute the computer-executable instructions to cause the tiling server to:
   receive sensor data from one or more sensors in the plurality of sensors;
   assign the sensor data to a base tile in the first layer in the hierarchy of tiled layers based on one or more properties of the one or more sensors;
   in response to assigning sensor data to the base tile, identify and retrieve one or more aggregate tiles from the tile database that depend on the base tile in the first layer, the one or more aggregate tiles each taken from one or more further layers in the hierarchy of tiled layers;
   determine aggregate sensor data for each of the retrieved one or more aggregate tiles based on the sensor data stored on the base layer tile;
   assign the determined aggregate sensor data to the corresponding one or more aggregate tiles; and
   output the one or more aggregate tiles.

2. The system of claim 1, wherein each of the plurality of sensors captures sensor data in substantially real time.

3. The system of claim 2, wherein the assigned sensor data is written to the first layer of tiles in the memory of the tile database by the tiling server.

4. The system of claim 3, wherein the tiling server comprises a cache memory for storing a plurality of aggregate tiles after assigning aggregate data to those aggregate tiles.

5. The system of claim 4, wherein the tiling server is further configured to flag the retrieved one or more aggregate tiles in the tile database to indicate that the retrieved aggregate tiles are in the cache memory.

6. The system of claim 5, wherein the tiling server is further configured to write one or more of the aggregate tiles stored in the cache memory to the memory of the tile database when one or more predefined conditions are satisfied.

7. The system of claim 6, wherein the one or more predefined conditions comprises one or more of: the cache memory storing a predefined number of tiles; the cache memory being full to at least a predefined fraction; and/or a predefined period of time.

8. The system of claim 7, further comprising a user interface configured to request one or more aggregate tiles from the tiling server, wherein outputting the aggregate sensor data comprises outputting one or more aggregate tiles from a layer in the hierarchy of tiled layers to the user interface for display.

9. The system of claim 8, wherein the user interface is further configured to request, in response to a user input, one or more aggregate tiles from a different layer in the hierarchy of tiled layers, and wherein the tiling server is configured to output one or more aggregate tiles from the different layer in the hierarchy of tiled layers to the user interface for display.

10. The system of claim 9, wherein aggregating the sensor data comprises: averaging the sensor data on a tile; determining the maximum value of sensor data on a tile; determining the minimum value of sensor data on a tile; determining a sum of the sensor data on a tile; and/or determining a derivative of the sensor data on a tile.

11. The system of claim 10, wherein the plurality of sensors may comprise one or more of: a temperature sensor; an acoustic sensor; an electromagnetic sensor; a seismic sensor; an optical sensor; a pressure sensor; and/or a flow sensor.

12. The system of claim 11, wherein each of the base tiles and aggregate tiles comprises a two-dimensional array of data points.

13. The system of claim 12, wherein the two-dimensional array of data points corresponds to: a two dimensional array of sensors; a two-dimensional slice of a three dimensional array of sensors; or a one dimensional array of sensors at a sequence of times.

14. The system of claim 13, wherein each layer in the hierarchy of tiled layers is representative of sensor data aggregated on a different spatial and/or temporal scale.

15. A method of aggregating sensor data using a hierarchy of tiled layers, the hierarchy of tiled layers comprising:
a first layer comprising a plurality of base tiles, each base tile associated with sensor data from a plurality of sensors in at least one of a spatial range or a temporal range, and
a plurality of further layers comprising aggregate tiles, each layer of aggregate tiles depending on one or more tiles in a previous layer of the hierarchy of tiled layers, the method comprising:
receiving sensor data from one or more sensors in the plurality of sensors;
assigning the sensor data to a base tile in the first layer in the hierarchy of tiled layers based on one or more properties of the one or more sensors;
in response to assigning sensor data to the base tile, identifying and retrieving one or more aggregate tiles from a tile database that depend on the base tile in the first layer, the one or more aggregate tiles each taken from one or more further layers in the hierarchy of tiled layers;
determining aggregate sensor data for each of the retrieved one or more aggregate tiles based on the sensor data stored on the base layer tile;
assigning the determined aggregate sensor data to the corresponding one or more aggregate tiles; and
outputting the one or more aggregate tiles.

16. The method of claim 15, wherein the plurality of sensors captures sensor data in substantially real time.

17. The method of claim 16, wherein the assigned sensor data is written to the first layer of tiles in a memory of a tile database.

18. The method of claim 17, wherein further comprising storing a plurality of aggregate tiles in a cache memory after assigning aggregate data to those aggregate tiles.

19. The method of claim 18, further comprising flagging the retrieved one or more aggregate tiles in the tile database to indicate that the retrieved aggregate tiles are in the cache memory.

20. A non-transitory computer readable medium comprising computer readable code that, when executed by a computing apparatus, causes the apparatus to perform a method comprising:

accessing a hierarchy of tiled layers comprising:
- a first layer comprising a plurality of base tiles, each base tile associated with sensor data from a plurality of sensors in at least one of a spatial range or a temporal range, and
- a plurality of further layers comprising aggregate tiles, each layer of aggregate tiles depending on one or more tiles in a previous layer of the hierarchy of tiled layers;

receiving sensor data from one or more sensors in the plurality of sensors;

assigning the sensor data to a base tile in the first layer in the hierarchy of tiled layers based on one or more properties of the one or more sensors;

in response to assigning sensor data to the base tile, identifying and retrieving one or more aggregate tiles from a tile database that depend on the base tile in the first layer, the one or more aggregate tiles each taken from one or more further layers in the hierarchy of tiled layers;

determining aggregate sensor data for each of the retrieved one or more aggregate tiles based on the sensor data stored on the base layer tile;

assigning the determined aggregate sensor data to the corresponding one or more aggregate tiles; and outputting the one or more aggregate tiles.

* * * * *